United States Patent [19]
Beauvais

[11] Patent Number: 5,462,333
[45] Date of Patent: Oct. 31, 1995

[54] CHILD SAFETY SEAT

[75] Inventor: Randall Beauvais, Fenton, Mo.

[73] Assignee: Life Forece Associates, LP, Fenton, Mo.

[21] Appl. No.: 831,199

[22] Filed: Jan. 31, 1992

Related U.S. Application Data

[63] Continuation-in-part of Ser. No. 260,598, Oct. 28, 1988, Pat. No. 5,110,182.

[51] Int. Cl.$^6$ .................................................. B60N 2/42
[52] U.S. Cl. ........................... 297/216.11; 297/216.19; 297/256.13
[58] Field of Search .................... 297/216.11, 216.19, 297/256.13, 216.1, 484, 480

[56] References Cited

U.S. PATENT DOCUMENTS

| | | | |
|---|---|---|---|
| 2,634,802 | 4/1953 | Stumm | 297/484 X |
| 2,664,140 | 12/1953 | Kindelberger. | |
| 3,111,342 | 11/1963 | De Vos. | |
| 3,561,817 | 2/1971 | Needham | 297/484 X |
| 3,610,629 | 10/1971 | Amato | 297/216.19 X |
| 4,159,120 | 6/1979 | Föhl. | |
| 4,688,849 | 8/1987 | Tsuge et al. | 297/484 X |
| 4,738,485 | 4/1988 | Rumpf | 297/480 |
| 4,763,924 | 8/1988 | Karlin. | |
| 4,790,601 | 12/1988 | Burleigh et al. | 297/484 |
| 4,884,652 | 12/1989 | Vollmer. | |
| 5,022,707 | 6/1991 | Beauvais. | |
| 5,052,750 | 10/1991 | Takahashi et al. | 297/250.1 |
| 5,110,182 | 5/1992 | Beauvais | 297/716.19 |

FOREIGN PATENT DOCUMENTS

| | | | |
|---|---|---|---|
| 611065 | 12/1960 | Canada | 297/484 |
| 2115743 | 7/1972 | France. | |
| 2159104 | 6/1973 | France. | |
| 2261158 | 9/1975 | France. | |
| 2108718 | 8/1972 | Germany | 297/484 |
| 2612263 | 9/1977 | Germany. | |
| 3445497 | 6/1986 | Germany | 297/484 |

Primary Examiner—José V. Chen
Attorney, Agent, or Firm—Kenyon & Kenyon

[57] ABSTRACT

A child safety seat for holding a child is either formed integrally with, or designed to be installed on, a seat of a vehicle that is subject to sudden deceleration. The child safety seat may include a base section which may be releasably mounted on onto the vehicle seat, and a seat section. In various embodiments the movement of the seat section relative to the base section is controlled by ramps and linkages and by various combinations of ramps and links. In further embodiments, the child safety seat includes an apparatus for tightening the seat belt in response to the sudden deceleration of the vehicle and may also include energy absorbing members which are permanently deformed as the seat belt is tightened.

22 Claims, 17 Drawing Sheets

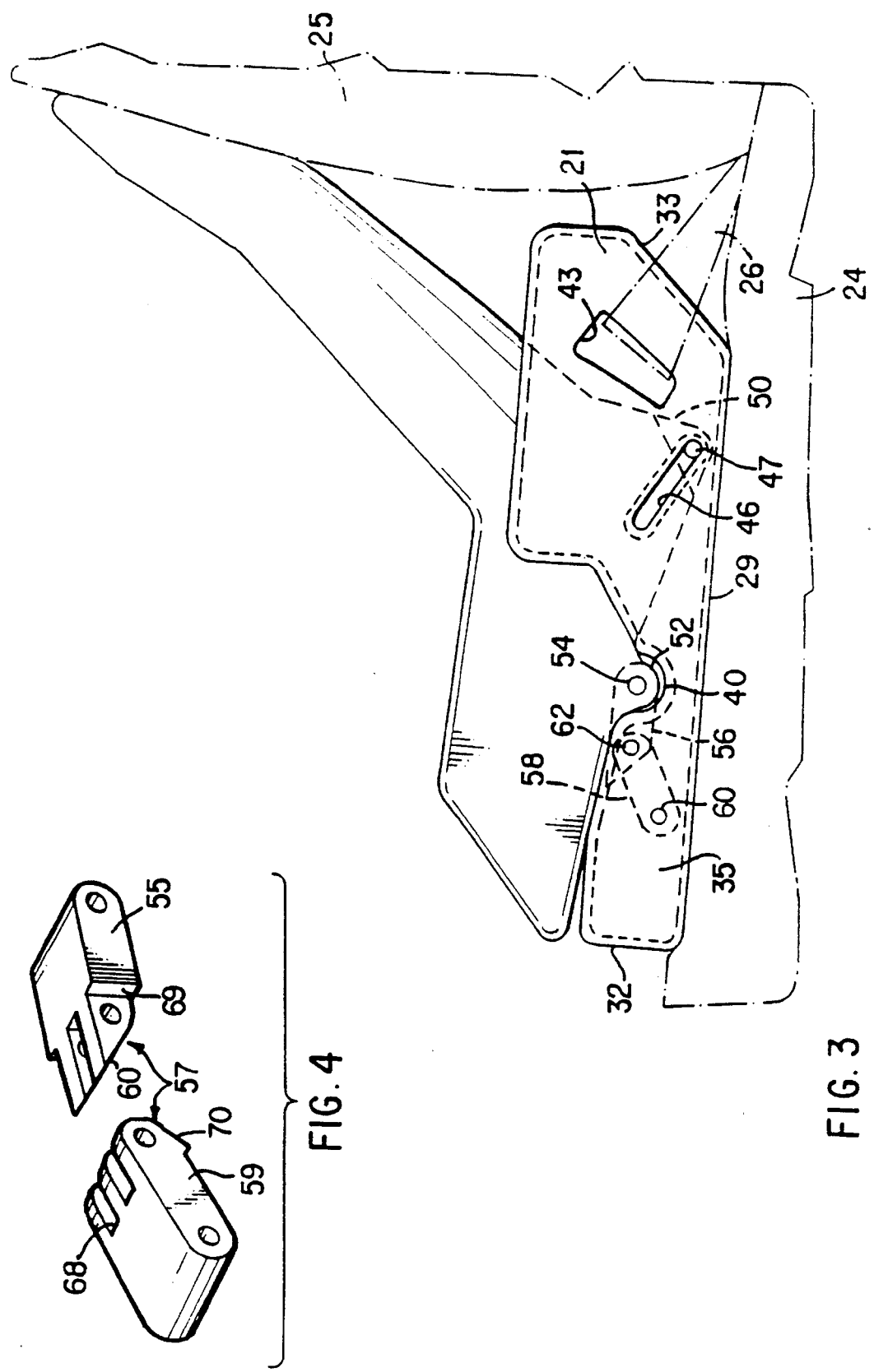

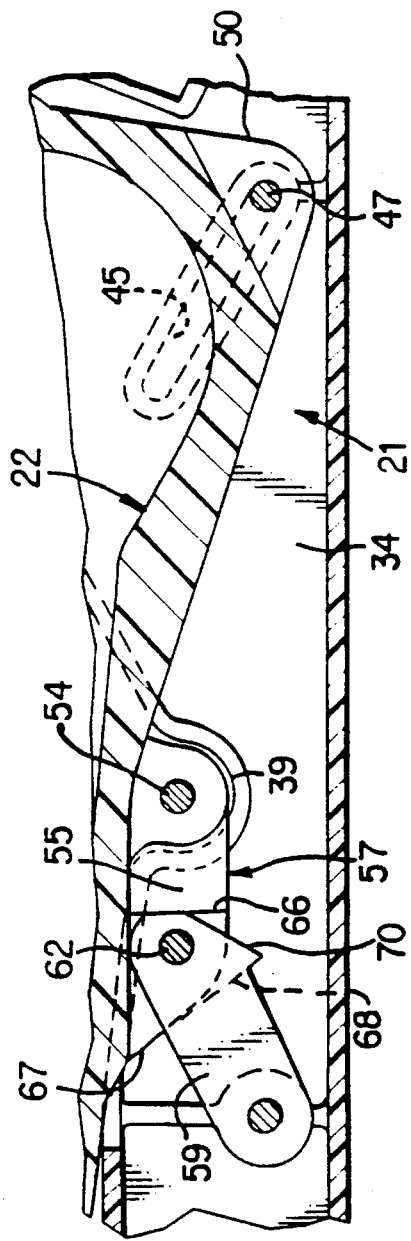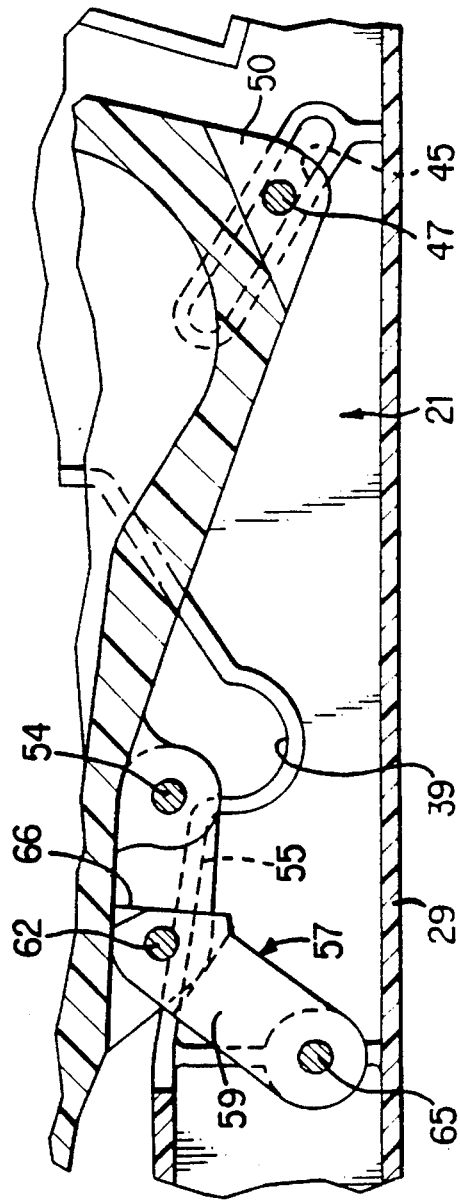

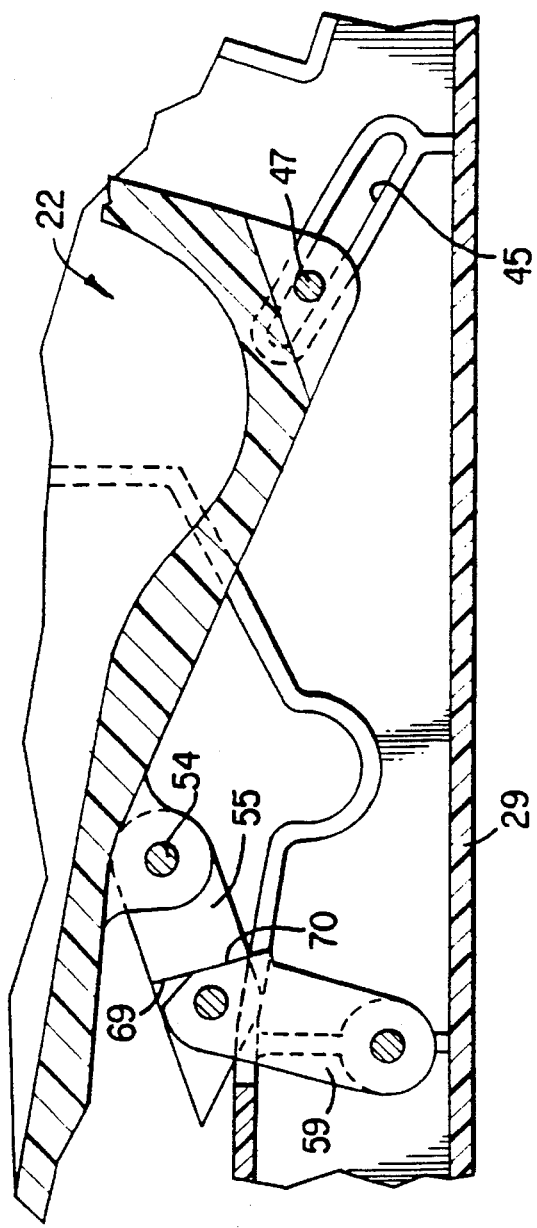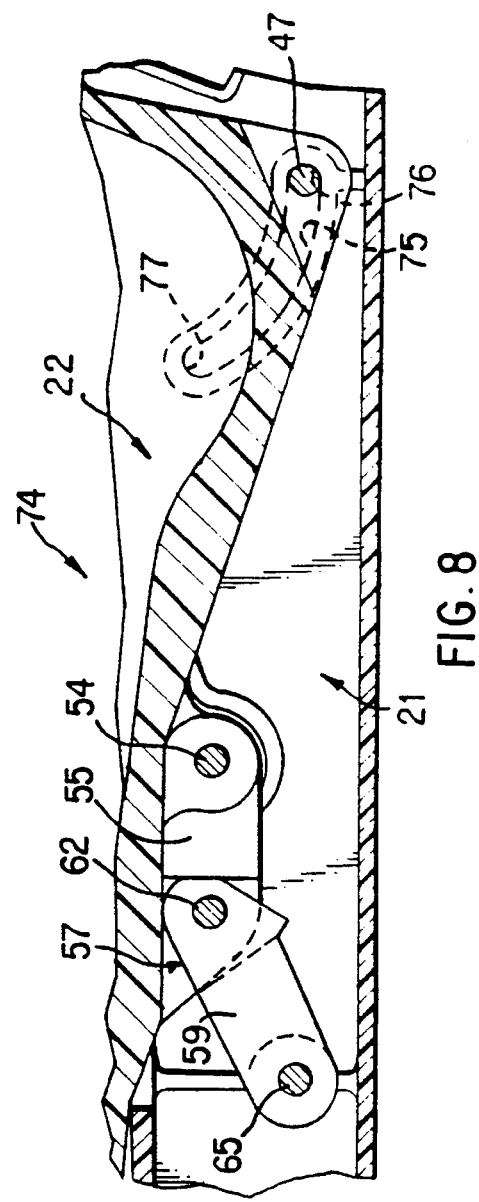

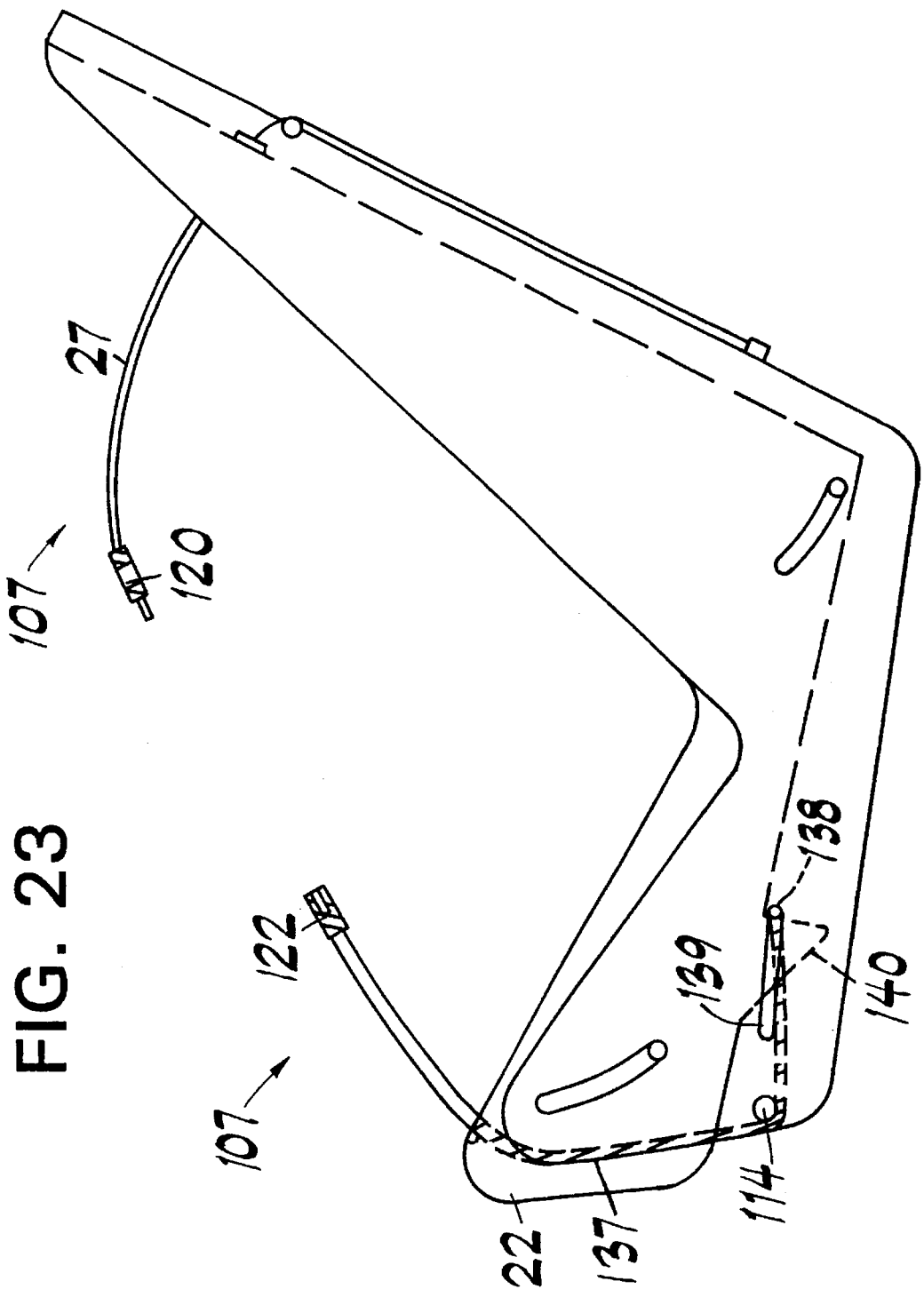

CHILD SAFETY SEAT

This application is a continuation-in-part of U.S. application Ser. No. 07/260,598 filed Oct. 28, 1988, now U.S. Pat. No. 5,110,182.

Reference is also made to U.S. Pat. No. 5,022,707, issued Jun. 11, 1991 to Beauvias et al., wherein some of the linkages and arrangements for the appropriate interconnections of the seat and the base are shown but not in a child safety seat.

BACKGROUND OF THE INVENTION

This invention relates to a child safety seat particularly for infants and children for use in vehicles. Even more particularly, this invention relates to such a child safety seat that has a base attachable to a vehicle seat and has a child safety seat connected to the base in such a way that the child safety seat, in response to a sudden deceleration of the vehicle, moves through a controlled path that reduces or avoids injury to an infant or child occupying the child safety seat. This invention also relates to an improved device for tightening a seat belt in response to the movement of the seat through a controlled path.

Known devices for tightening a seat belt in response to movement of the seat have required elaborate apparatus. For example, the device disclosed in U.S. Pat. No. 4,738,485, to Rumpf ("the Rumpf patent"), requires a cable and pulley system which is completely separate from the seat belt itself.

FIG. 1 of the Rumpf patent shows a vehicle seat apparatus 20 including a seat 30, and an occupant seat belt restraint 40, attached to seat 30. The seat 30 is mounted in tracks 62 and 64, such that the entire seat 30 moves forward and the front of seat 30 moves upward upon sudden deceleration of the vehicle.

Upon forward motion of the seat, an actuator mechanism 142 rotates a drive gear 132 to wind the belt webbing 82 onto spool 134 to tighten the belt. The actuator mechanism 142 includes a cable 146 which is coupled on one end to a retractor 150 which is coupled to a point on the vehicle seat apparatus 20 which does not move in response to the deceleration of the vehicle. The cable extends from retractor 150 around pulley 144 through the back of seat 30 and is coupled on its other end to a drive bar 148. As seat 30 moves forward, pulley 144 moves forward relative to retractor 150, thereby causing cable 146 to pull down on drive bar 148. This rotates drive gear 132, which causes shoulder belt 82 to be tightened around the occupant.

The complexity of the apparatus of the Rumpf patent makes the device expensive and space consuming. In addition, the complexity of the device increases likelihood of failure of one of the components and, therefore of the entire apparatus. There is thus a need for a simple, reliable apparatus, requiring a minimum of space, for tightening a seat belt in response to movement of the seat.

SUMMARY OF THE INVENTION

A child safety seat according to one embodiment of the present invention consists of a portable base that has means for releasably attaching it to a rest, such as the seat of a vehicle that is subject to sudden deceleration. The base may be of any configuration and is illustrated as being hollow, having a bottom, sides, a front and a rear, and being essentially open at the top into which the seat is mounted. In all of the embodiments there are connections between the base and the child safety seat that produce controlled movement of the seat relative to the base in such manner that the front of the seat moves forward and is elevated upon sudden deceleration of the vehicle and also the back of the seat moves forward and is elevated in the same action. All of the mechanism is self contained within the seat and its base to afford portability.

The seat is particularly useful for children. It can be made with an upright back similar in tilt to the back in a regular car seat or it can be made with a greater tilt and an upwardly extending forward end to support an infant who is too young to sit upright. In all cases, this device, although self contained and child safe, can provide for the safety of the child or infant by preventing the child or infant from being thrown forward from the seat upon sudden deceleration of the vehicle.

A child safety seat according to one embodiment of the present invention provides a child safety seat that comprises a base that can be releasably attached to a vehicle seat and connections between the base and the child safety seat which enable the child safety seat to move in a way that will counteract the inertia that normally tends to throw the child or the occupant forwardly against, for example, the dashboard or the windshield of the vehicle.

Another advantage of a child safety seat according to one embodiment of the present invention is the provision of a child safety seat arrangement that is self-contained and can be used in a vehicle or can be taken out and used outside the vehicle.

An advantage of a child safety seat according to another embodiment of the present invention is provided through the inclusion of a seat belt which is tightened upon rotation and/or motion of the chair in response to a sudden deceleration of the vehicle. The simplicity and reduced cost of the mechanism of the present invention make it more suitable for use in child safety seats than prior art devices such as the apparatus disclosed in the Rumpf patent.

A child seat according to yet another embodiment of the present invention affords the further advantage of providing a child seat which is permanently mounted to an adult seat in a vehicle. The seat may be folded into an out-of-use position and, when in an in-use position, provides the energy absorbing motion and seat belt tightening mechanisms of the other embodiments of the invention.

BRIEF DESCRIPTION OF THE DRAWINGS

FIG. 3 is a side elevation of the child safety seat;

FIG. 4 is a view of a linkage broken apart to show it in detail;

FIG. 5 is an enlarged side view of the lower control portion of the child safety seat of FIG. 3 showing the seat and the linkage thereof in the relaxed inactive position;

FIG. 6 is a view similar to FIG. 5 but with the seat and linkage in a partially elevated position responsive to a sudden deceleration;

FIG. 7 is a side view similar to FIG. 5 with the seat and linkage in a further elevated position;

FIG. 8 is a side view similar to FIG. 5 but of a second form of the child safety seat in the relaxed position;

FIG. 23 is a side view of an eleventh embodiment of the present invention

DESCRIPTION OF PREFERRED EMBODIMENT

Figure 1:
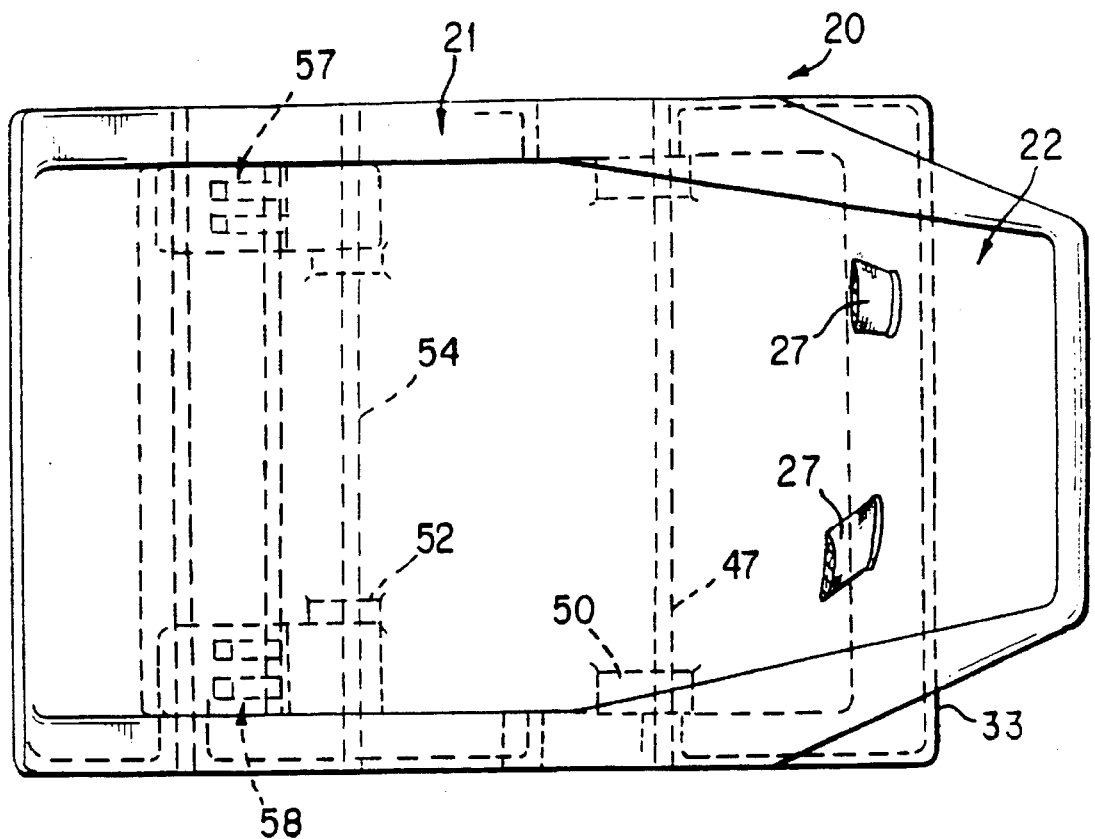
FIG. 1 is a plan view of a first form of the child safety seat.
Figure 2:
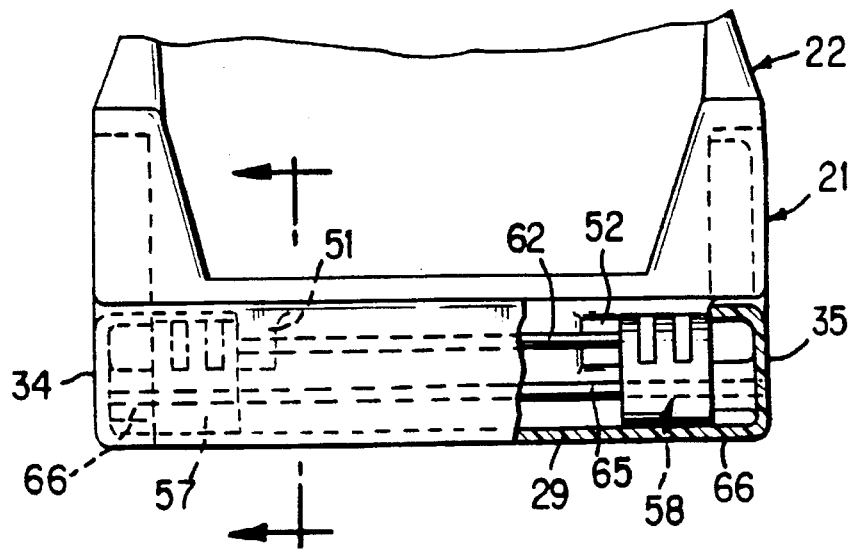
FIG. 2 is a front elevation view thereof partly broken away taken from the left end of FIG. 1.

As illustrated particularly in FIG. 3, this child safety seat 20 is adapted to be temporarily attached or mounted upon a suitable place such as a vehicle seat. In particular it is useful for children or babies since it can give them a greater security than they can get with other arrangements. It incorporates a base 21 and a seat 22, the seat being mounted upon the base for movement in a manner to be described.

In this illustration, the vehicle seat has a seat portion 24 and a back portion 25, diagrammatically illustrated by dashed lines in FIG. 3. A conventional seat belt 26 attached to the vehicle is shown in dashed lines. In the past, such a conventional seat belt has been used to secure a conventional child safety infant or child seat to the vehicle seat. Likewise, the seat belt 26 is used to secure the base 21 of the seat 20 firmly to a vehicle seat.

The base 21 can be of plastic molding or of other material that is sufficiently strong and rigid. Preferably, the seat 22 has the usual seat belts including the belts 27 illustrated for securing the child against sliding in and out of the seat.

The base 21 consists essentially of an open top receptacle having a bottom wall 29, front and back walls 32 and 33, side walls 34 and 35, and generally having its upper edges turned inward a short distance to add strength and rigidity. The seat 22 fits into the open top of this base 21. These seat and base configurations are illustrative and it will be understood that the present invention can be incorporated with a child safety seat having a variety of base and seat configurations.

The side walls 34 and 35 are provided with opposite recesses 39 and 40 for a purpose to appear. The side walls likewise have seat belt receptacles or openings 42 and 43 to receive the seat belt 26 to secure the base 21 to the vehicle.

The seat 22 is secured to the base 21 for controlled relative movement. To this end, there are slots 45 and 46 in the two sides 34 and 35 of the base 21 that receive a spindle rod 47 and that extend generally upwardly from their initial position, at an angle of approximately 30°. The rod 47 is supported in brackets 49 and 50 extending on opposite sides from the lower rearward portion of the seat 22. By this arrangement, should the seat 22 move forward, it will also move upwardly in its rear portion.

The front part of the seat 22 is also supported for movement. To this end, the seat has depending brackets 51 and 52 to receive a pivot rod 54 that passes through the back elements 55 and 56 of two compound links 57 and 58. The recesses 39 and 40 prevent interference between these brackets 51 and 52 and the sides 34 and 35, respectively, of the base 21. The front elements of these two compound links 57 and 58 are indicated at 59 and 60. The ends 55 and 59 of the compound link 57 and the two ends 56 and 60 of the compound link 58 are respectively pivotally connected together by a rod 62. The front ends of the elements 59 and 60 are likewise mounted upon a rod 65, the ends of which are fixed, such as into suitable bosses 66 formed integrally with the base 20. (The rods 54, 62 and 65 serve as pivots for both compound links 57 and 58, but individual pins for each compound link 57 and 58 would be satisfactory.)

The compound links 57 and 58 are designed to have limited pivotal movement. Thus if the seat moves from the position of FIG. 5 to that of FIG. 6, the two back link elements 55 and 56 will not pivot about the rod 54, but the forward link elements 58 and 59 will pivot about both of their two rods 62 and 65 through a limited arc. Thereafter the two compound links 57 and 58 will pivot as units about the rods 54 and 65 from the position of FIG. 6 to that of FIG. 7.

To accomplish the foregoing, reference will be made to the link 57 as it appears in FIGS. 4–7, the other link 58 being the same. The rear link element 55 has a sloping face 67 that engages a face 68 on the front link element 59 to limit the relative movement of the two link elements in the direction of straightening themselves out and prevent them from inverting and moving the rod 62 below the plane of the two rods 54 and 65.

Additionally, the rear element 55 has a flat face 69 whereas the front element 59 has an arcuate end terminating in a straight wall 70 that can be engaged with the face 69 of the rear member 55. When the face 69 and wall 70 are engaged, as shown in FIG. 6, further pivoting between the two link elements 55 and 59 about the rod 62 is thereafter blocked so that the two elements 55 and 59 move as one unitary link, such as from the position of FIG. 6 to the position of FIG. 7.

Thus upon a sudden deceleration or collision of the vehicle, the base 21 remains fixed to the vehicle seat 24 whereas the child safety seat 22 tends to move forward because of inertia. In so doing, as the rear of the seat is moved forward, it is lifted by movement of the rod 47 within the slots 45 and 46. As the front of the seat moves forward, it is lifted to a greater extent than the rear. In the first stage of movement in this embodiment, the front is raised solely by the action of the link elements 59 and 60 pivoting about the rods 65 and 62, since the other link elements 55 are held against the bottom of the seat 21.

When the movement of the seat has reached the position of FIG. 6, the faces 69 engage the walls 70 causing the compound links 57 and 58 to operate as unitary links equivalent to the distance between the rods 54 and 65. Thus the front of the seat is raised more rapidly for this second stage of the movement than for the first stage.

Figure 9:
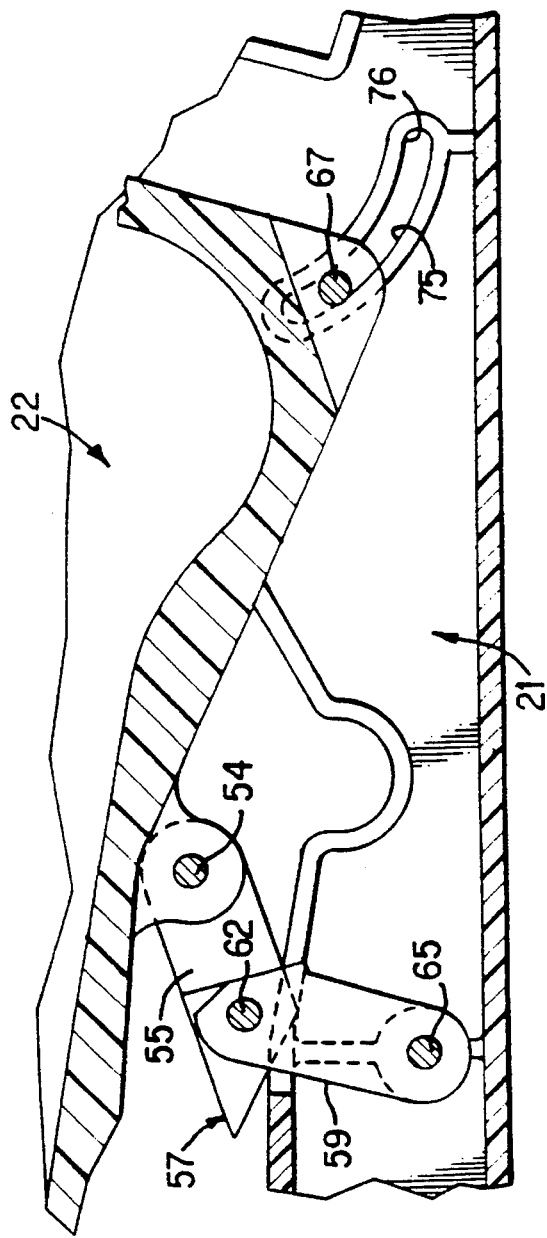
FIG. 9 is a side view similar to FIG. 8 but with the seat elevated responsive to a sudden deceleration.

FIGS. 8 and 9 show a second embodiment of the invention 74. All the parts are the same except for the fact that instead of straight slots 45 as in FIGS. 5–7, arcuate slots 75 are incorporated. Therefore, parts of FIGS. 8 and 9 corresponding to those of FIGS. 5, 6 and 7 are identified by the same numbers. The arcuate slots 75 extend from a lower rear end 76 to an upper front end 77.

The center of curvature in the example is illustrated as being above the lowermost part of the slot 75 and about the same distance above that point as it is from the upper end of the slot 75.

The advantage of this arrangement is that the initial movement of the back of the seat is not essentially one of elevation because the tangent at the initial (rear) end 76 of the slot 75 is at or nearly horizontal. This allows the rod 47 to initiate movement in substantially a forward direction and to gain momentum before it is forced upwardly. As the rod 47 moves further forward, the curvature of the slot 75 begins to elevate the rod 47 at a progressively steeper rate.

Figure 10:
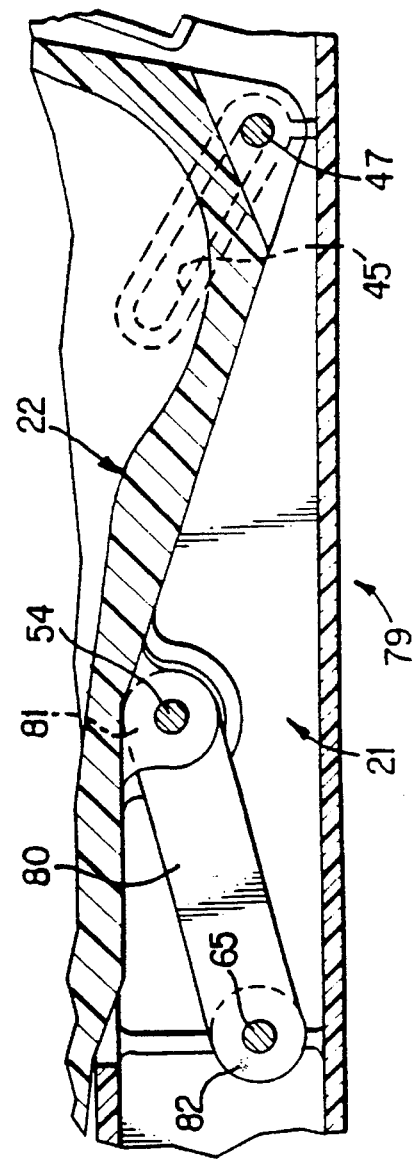
FIG. 10 is a side view similar to FIG. 5 but of a third form of the child safety seat in relaxed position.
Figure 11:
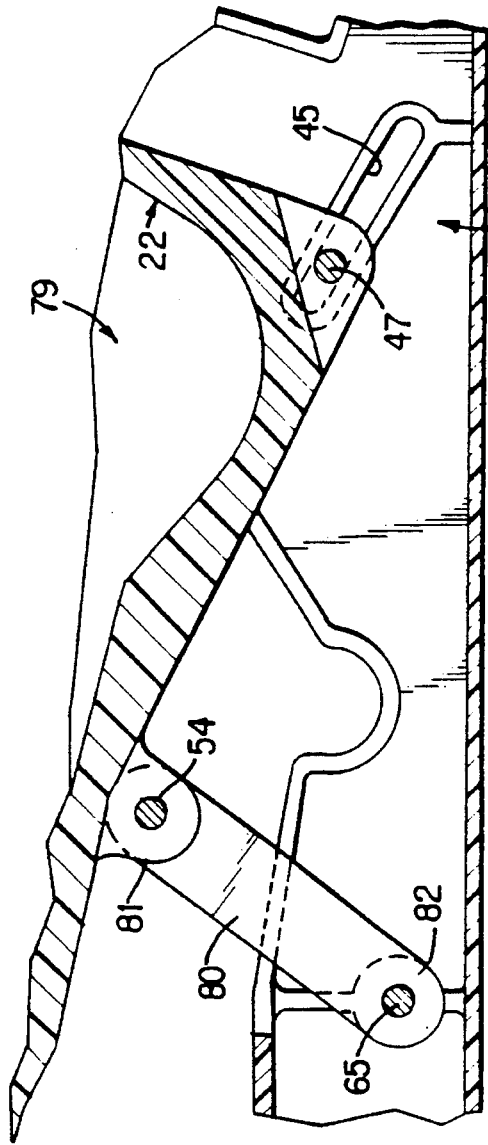
FIG. 11 is a side view similar to FIG. 10 but with the seat in an elevated position responsive to a sudden deceleration.

FIGS. 10 and 11 show a third embodiment 79 similar to that of FIGS. 5–7 save that the compound links 57 and 58 are replaced by forward links 80 of constant length. Thus it will not have the arrangement for initial lift of the forward part of the seat at a low rate followed by an increasing rate of lift as in the compound links 57 and 48. In the embodiment 79, the rearward end 81 of a link 80 pivots on the rod 54, and the forward end pivots on the rod 65. The back of the seat in this arrangement is shown as having the slot 45 as in FIGS. 5–7, but it will be understood that a curved slot 75 as shown in FIGS. 8 and 9 could be incorporated with the links 80 of FIGS. 9 and 10.

Figure 12:
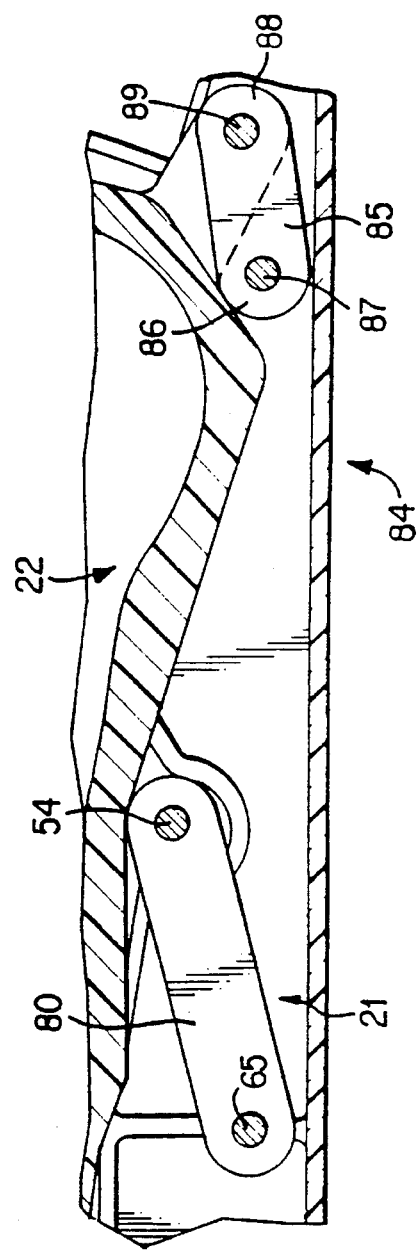
FIG. 12 is a side view similar to FIG. 5 but of a fourth form of the child safety seat shown in its relaxed inactive position.
Figure 13:
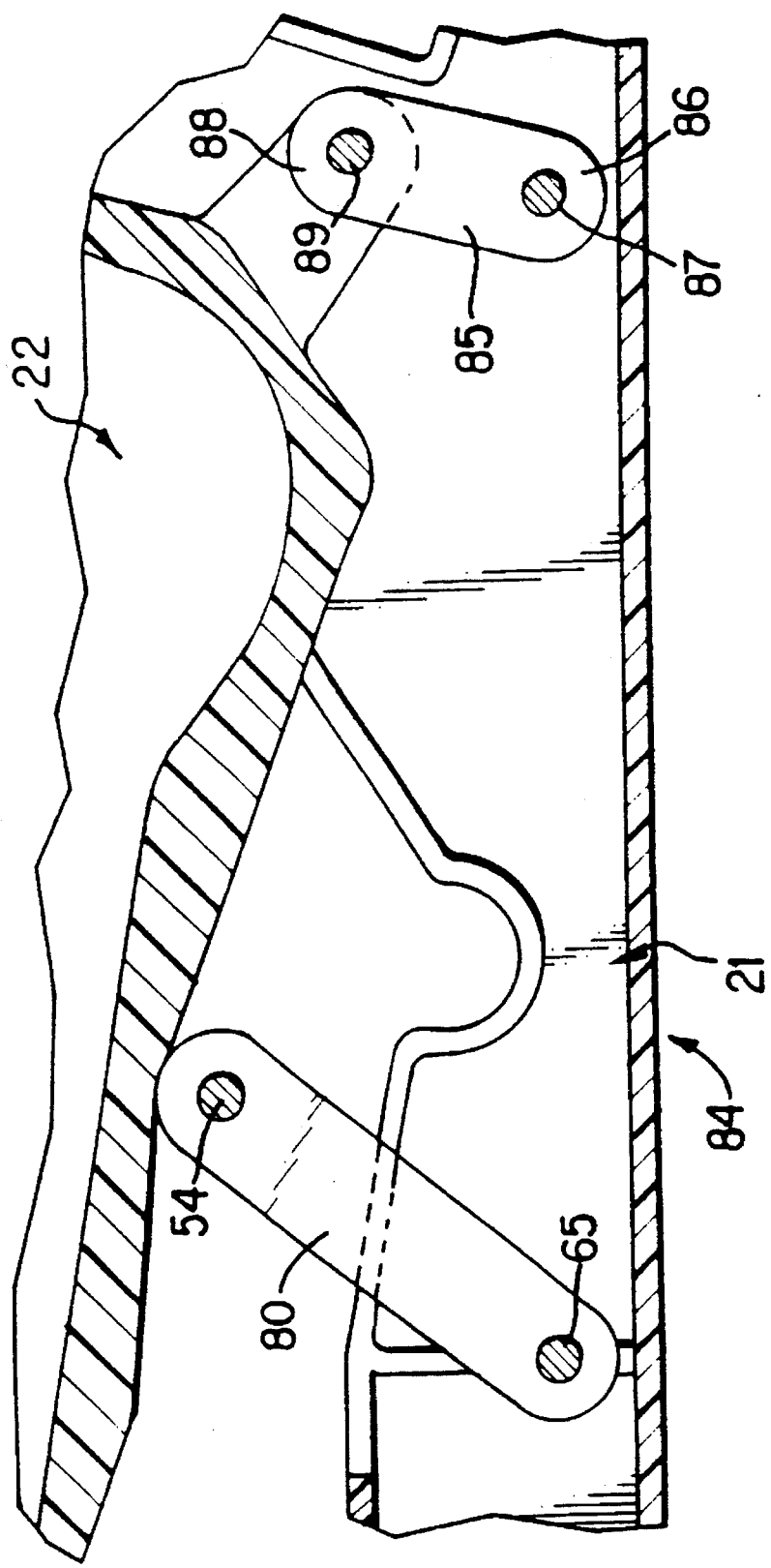
FIG. 13 is a view similar to FIG. 12 but with the seat in an elevated position responsive to a sudden deceleration.

A fourth embodiment 84 of FIGS. 12 and 13 is similar to the embodiment 79 of FIGS. 10 and 11 except that in place of the slot 45 and rod 47 at the rear, on each side of the child safety seat, there is a fixed sized link 85 at the rear. The front end 86 of the link is pivoted on a rod 87 suitably supported by the base 21. The rear end 88 of the link 85 is pivotally mounted on a rod 89 suitably supported by the seat 22.

In the starting position, the links may be as shown in FIG. 12. As the vehicle is moving to the left in the drawings and is suddenly stopped, forward inertia of the seat 22 will cause the links 80 and 85 to pivot to positions such as illustrated in FIG. 13. This will elevate the front and rear of the seat 22 as the front and rear move forward. Because the link 80 is longer than the link 85, the front of the seat 22 will be elevated at a faster rate than the rear.

Figure 14:
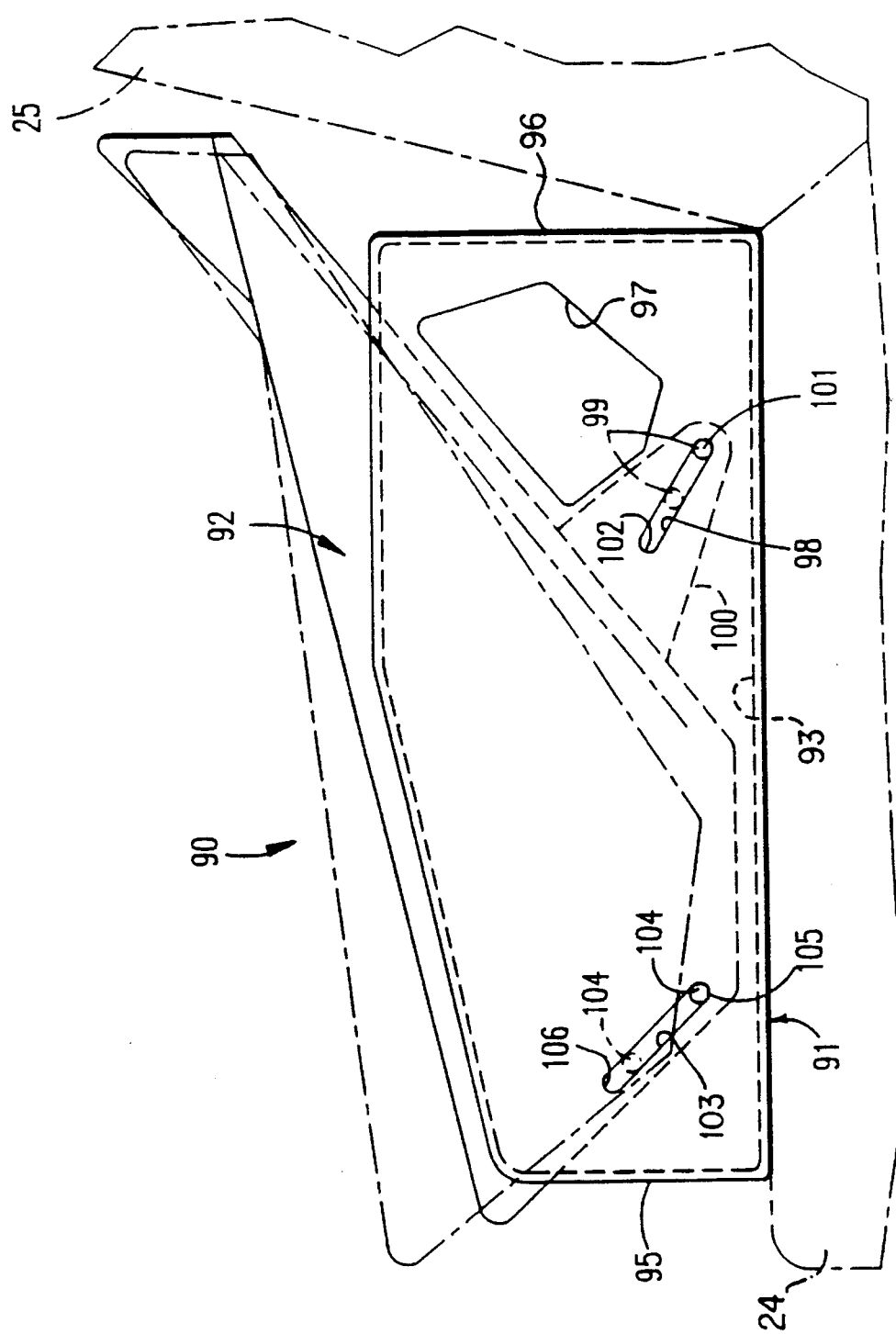
FIG. 14 is a side view of a fifth embodiment of the child safety seat illustrating an infant seat that embodies these general principle but is appropriately tilted in the starting position for holding an infant or baby.

In FIG. 14, there is shown a modification not merely of the tilting mechanism, but also of the seat itself. This child safety seat 90 has a base 91 and a seat 92. However, whereas the seat 20 of FIG. 1 is more upright as is appropriate for a somewhat older child capable of sitting upright, the seat 92 is more inclined as is customary for supporting a baby or infant. In FIG. 14, the seat 92 appears in its initial at rest position in full lines, and in dashed lines as it is moved upwardly responsive to a sudden deceleration.

The base 91, as before, may be of any appropriate form and is shown is an open-topped receptacle with a bottom wall 93, two side walls 94, and front and rear walls 95 and 96. The side walls 94 have openings 97 to receive a seat belt so the base 91 can be secured to a vehicle seat 24 as is conventional. The seat 90 should face the front of the vehicle. The base 92 also has slots 98 in its side walls 94 at the rear in which a pin or rod 99 can slide. This rod 99 is mounted in brackets 100 that extend backwardly and downwardly from the seat 92, and the rod 99 extends across into the slots 98 on each side 94 of the base 91. The slot 98 is preferably at an angle of about 20°–30° extending forwardly and upwardly from its rear end 101 to its forward end 102.

At the forward end, each side wall 94 of the base 91 has a slot 103 that receives a rod 104 supported on the seat 92. Each slot 103 extends forwardly and upwardly from a lower rearward end 105 to a forward upper end 106, preferably at an angle that is about 5°–15° greater than the angle of the slot 98. For example, if the slots 98 are at an angle of about 25° to horizontal, the slots 103 are at angles of about 30°–40°. It is preferable that the forward end of the seat 92 rise further than the rear but both ends should move upwardly as well as forwardly.

It should be understood that forward and rearward slots like the slots 98 and 103 can be incorporated on the more upright seat 20. Further, any of the front and rear mechanisms for controlling upward and forward movement of the seat 22 could be incorporated in the embodiment 90 for controlling upward and forward movement of the seat 92. Still further, any of the forward control means, the compound linkages 57 or 58, the link 80, or the slot 103, can be incorporated with any of the rear control means (the slot 45, 46, or 98, the slot 75, or the link 85).

OPERATION

In all of these embodiments there is a child safety base into which is fitted a seat for movement forwardly and upwardly in response to a sudden abrupt deceleration of the base. Although the seat and base are self-contained, they can be used in connection with any vehicle or movable object that can be subjected to sudden deceleration. Also they can be removed from the vehicle and used elsewhere and returned repeatedly for use in the vehicle. The bases are designed to be supportive of the seats whether the bases are mounted on a vehicle seat or on a stationary support.

When the seats are mounted in a vehicle of one kind or another such as an automobile or an airplane, they should be fastened to the seat of the vehicle as by the seat belt 26 that is passed through the openings 43 or 97.

There are also other seat belts such as 44. There may be several of them in the back of the seat and there should be one of these that extends between the legs of an infant or child to keep the infant or child from sliding out from under the other seat belts and out of the seat itself.

In the arrangement of FIGS. 1–7, typically the slots 45 and 46 may be about 2½ inches long and can be at approximately 30° to the horizontal of the base.

The distance from the rod 54 to the rod 62 may be slightly less than two inches, and the distance from the rod 62 to the rod 65 is approximately two inches. The distance between the rods 54 and 65 in the positions of FIG. 5 is approximately four inches. When collapsed, as in FIG. 7, that distance is approximately 3½ inches. The distance between the rods 47 and 54 can be approximately seven inches. Similar dimensions could apply to all of the examples.

As noted, the base 21 should be made of some material that is strong enough to stand the uses to which it is put in operation. A molded plastic can suffice, particularly if its walls are turned in as illustrated, or are doubled.

Referring first to FIGS. 1–7, in the event of a sudden deceleration of the vehicle upon which the vehicle seat 24 is fixed, inertia will cause the seat 24 as well as the base 21, the seat 22 and the occupant to attempt to move forward until the energy is spent. Looking at FIG. 3, this inertia may cause the occupant to move forward ahead of or together with the back of the seat depending upon their relative degree of restraint or mechanical impediment to motion.

Tests have shown that the energy of impact may be dissipated or quickly spent if the back part of the seat moves up as well as the front part, although normally not as much. Consequently, upon a collision, with the arrangement of FIG. 3, the principal seat belt 26 may be stretched a little, and the vehicle seat 24 may travel forward. But the seat 22, moving forward relative to the base 21, will be lifted both in the front and the rear.

With the compound front link the initial forward movement produces little front elevation of the seat as shown by comparing FIGS. 5 and 6, while the rear of the seat is raised, although less than the front. After the condition of FIG. 6, the seat can continue to move forward to the position of FIG. 7, with the front of the seat being elevated to a greater degree than the rear of the seat.

It can be seen that the mechanism for producing the elevation of both the rear and the forward part of the seat 22 with respect to the base 21 is entirely self contained within the apparatus here shown. This means that the base is sufficiently strong to contain the mechanism including the links and the slides and the rods.

Normally, the seat will not have to move forward all the way. Moving about as far as shown in FIG. 7 is usually enough to spend the kinetic energy. Then the weight of the occupant will return the seat to its portion of FIG. 5 because of gravity.

In the device of FIGS. 8 and 9, the action of the forward part of the seat is the same as that of FIGS. 5–7. The rear slot 75, however, is in this case arcuate and concave upwardly so that the initial forward movement of the seat will not produce a great deal of movement upwardly of the rear of the seat because the initial part of the track or slot 75 is almost horizontal. It has been found that under certain circumstances, this is preferable to the straight slot shown in FIGS. 5–7.

The arrangement of FIGS. 10 and 11 has a straight slot 45 and the rod 47, but in place of the compound linkage, it has a single link 80 between the rod 54 and the rod 65. This means that the front part of the seat will lift more rapidly as soon as the seat moves forward at all and can lift further than the seat does in going from the position of FIG. 10 to that of FIG. 11 in contrast to what happens in the other example going from the position of FIG. 5 to that of FIG. 7. This arrangement has the virtue of relative simplicity.

The example of FIGS. 12 and 13 has links at both front and rear. The rear link in this case will normally move from the position of FIG. 12 to nearly a vertical position of FIG. 13 thereby lifting the rear of the seat while the front is moved up by the link 80. This arrangement has the virtue of simplicity.

FIG. 14 shows use of a forward and rear slot arrangement, the forward slot having a greater slope than the rear slot. In this case upon a collision or other sudden deceleration, the rear of the seat is moved upwardly as soon as the forward movement occurs. Certain tests have shown that in case of an abrupt deceleration of the vehicle, the occupant may move forward a little bit ahead of the seat itself and then the seat catches up with the occupant. With the slot arrangement as shown here, that situation is minimized.

The use of this arrangement with the infant seat, which can be used before the child is sitting up on its own, is particularly useful. However, it also can be applied to any of the other arrangements.

It will be seen that in all of these cases, the base comprises a receptacle for receiving the seat and also for receiving the operating mechanism comprising the links or the slots or the links and slots. This is to be contrasted with arrangements such as those shown in U.S. Pat. Nos. 2,575,953 and 4,687,255 and its companion U.S. Pat. No. 4,653,809, since in those cases, the seat itself does not move. In the latter two cases, there is a baffle that is placed in front of the person occupying the seat.

Each of the above-disclosed embodiments may further include a seat belt type restraining device. The seat belt restraining devices found in child seats typically consist of a strap, manually adjustable to the desired length, which may be coupled to a strap of fixed length, or to a stationary anchor attached to the seat. These straps are designed so that the length of the strap does not change after the manual adjustment, i.e., the strap should not loosen or tighten during use. However, these straps may loosen as the child moves about. In addition, when properly adjusted the straps are often uncomfortable. The straps are, therefore, more often adjusted to fit loosely around the child. For these reasons, the effectiveness of such seat belts is often significantly decreased.

In conjunction with the seat of the present invention, it is possible to provide a seat belt which will tighten as the seat moves in response to sudden deceleration of the vehicle. This arrangement provides greater protection as the child will be firmly held in position by the seat belts even if the belt has loosened since being adjusted. This also allows the seat belt to be initially adjusted more loosely around the child, thereby providing increased comfort and more effective restraint. Finally, it is possible to provide a seat according to the present invention which includes members which are permanently deformed as the seat moves in response to the sudden deceleration of the vehicle. This further absorbs kinetic energy. In fact, the inclusion of members which are permanently deformed reduces the effect of any recoil which the child might be subjected to. Energy which might have been felt through recoil is dissipated through the inelastic deformation.

Figure 15:
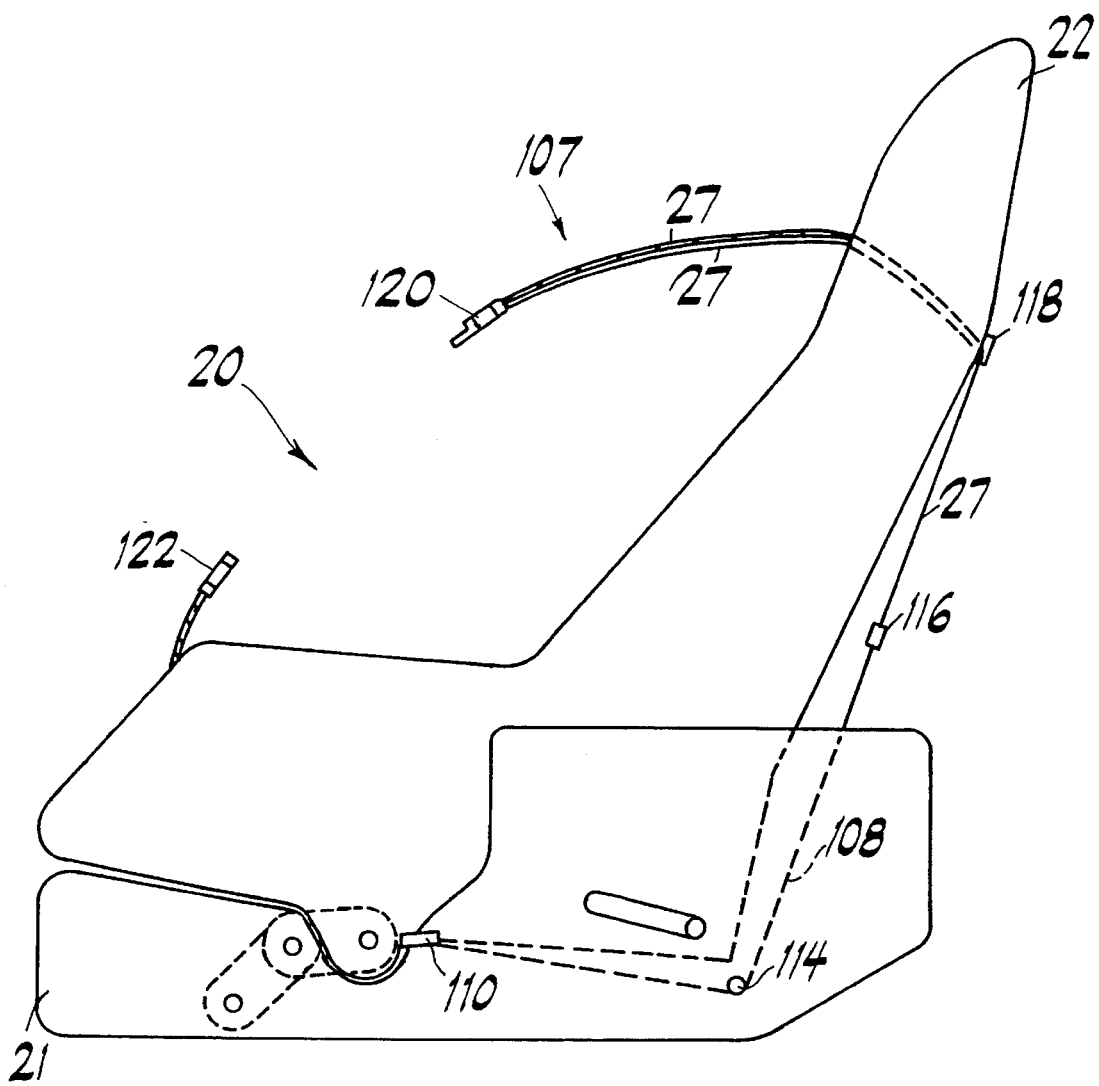
FIG. 15 is a side view of a sixth embodiment of the child safety seat.
Figure 16:
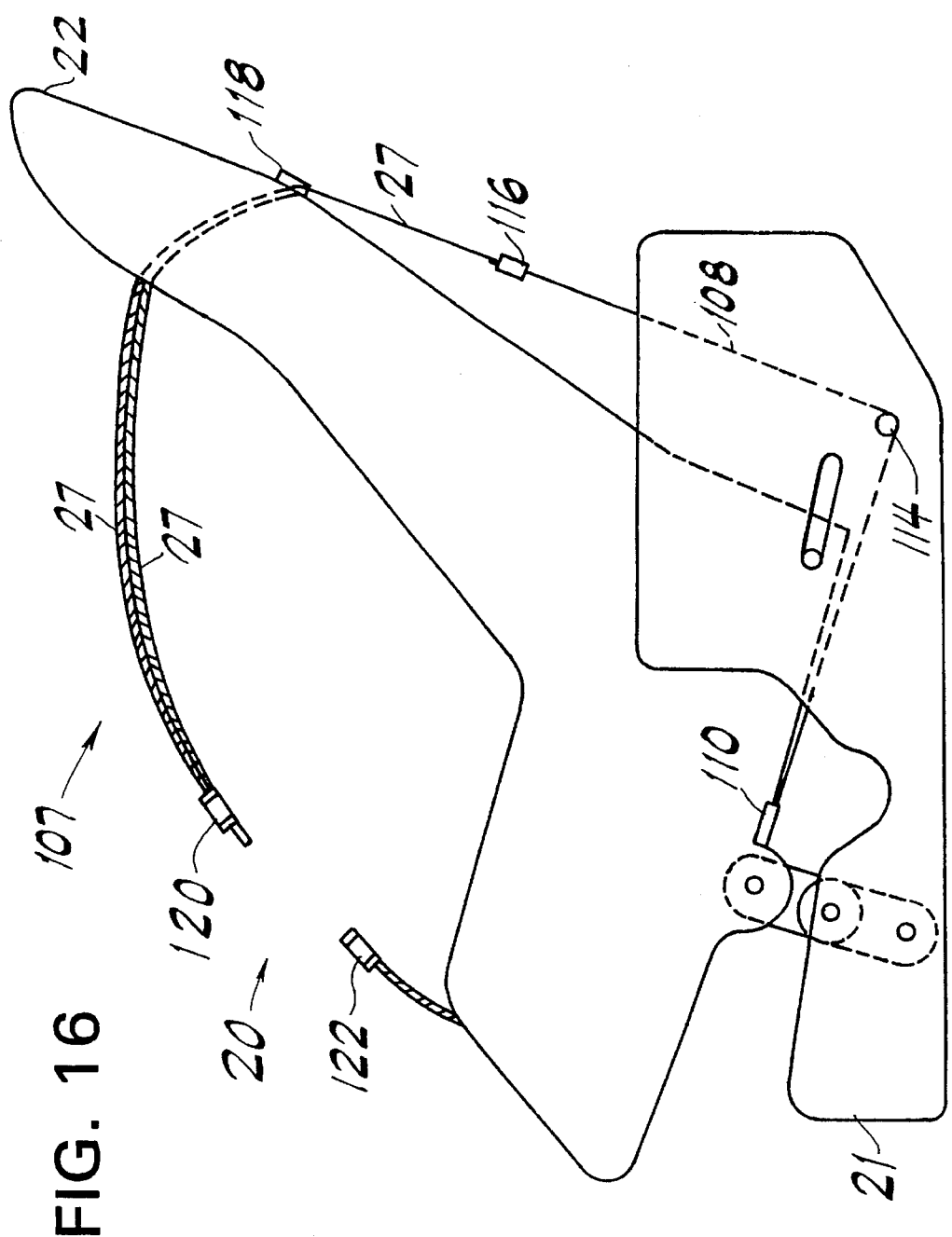
FIG. 16 is a side view similar to FIG. 15 but with the seat in an elevated position responsive to a sudden deceleration of the vehicle.
Figure 17:
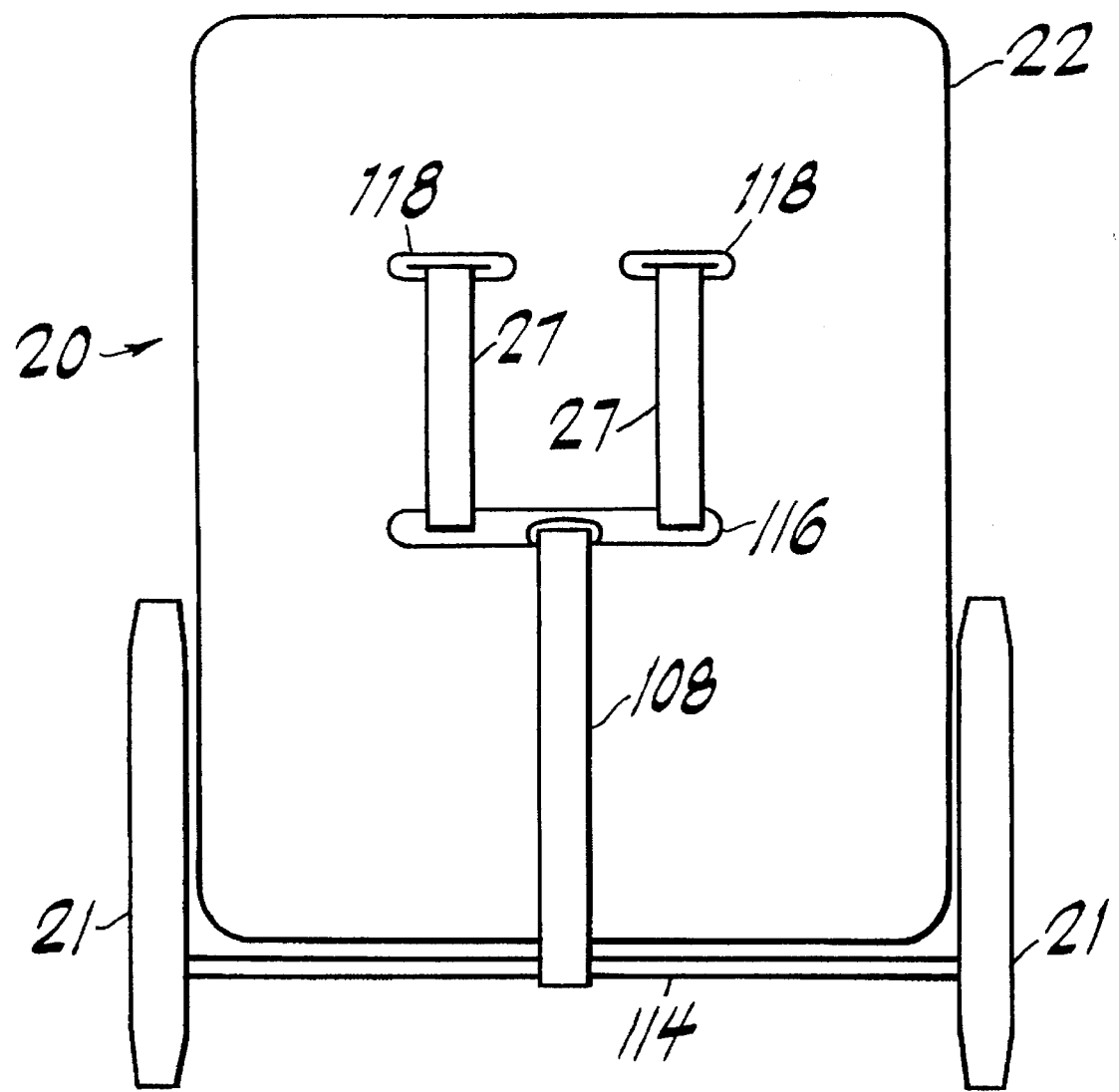
FIG. 17 is a back view of the sixth embodiment of the invention.

As illustrated in FIGS. 15 through 17, the child safety seat 20 includes a seat belt device indicated generally by numeral 107. Seat belt device 107 includes a restraining member comprising a strap 108 coupled on one end to a retractor 110 having a spring biased to retract the belt, as is well known in the art. Strap 108 extends around and is supported by rod 114 which is coupled on both ends to frame 21. The other end of strap 108 is coupled to the center of a bar 116. Straps 27 are coupled to either end of bar 116, each strap 27 extending therefrom through a respective opening 118 in the back of seat 22. The other ends of straps 27 are coupled to a tongue member 120 which may be coupled to buckle 122 which is anchored to frame 21.

Strap 108 may be extended from retractor 110, against the spring bias, in a continuous motion. However, by use of a known ratchet device, after the extension of strap 108 is stopped, retractor 110 will no longer permit extension of strap 108. Known mechanisms may be employed to allow the ratchet device to be released manually or to be released automatically upon complete retraction of strap 108. As the ratchet device will not allow further extension of the belt after the initial adjustment, the maximum belt length is fixed after the child is buckled in. Once the maximum belt length is fixed, that portion of the restraining member which extends from the openings 118 in the seat back 22 to tongue member 120, defines a first portion of the restraining member, while the portion extending from the retractor 110 around supporting rod 114 to openings 118 defines a second portion of the restraining member.

As shown in FIG. 16, as seat 22 rotates and moves forward due to the sudden deceleration of the vehicle, the distance between rod 114 and the back of seat 22 increases. This increases the length of the second portion of the restraining member by lengthening the distance that strap 108 and, consequently, straps 27 must traverse before reaching openings 118. As the length of the second portion of the restraining portion is increased by this motion of the chair, the length of the first portion of the restraining member is necessarily decreased. Thus, the seat belt is tightened around the child as the seat rotates and moves forward due to the sudden deceleration of the vehicle.

Figure 18:
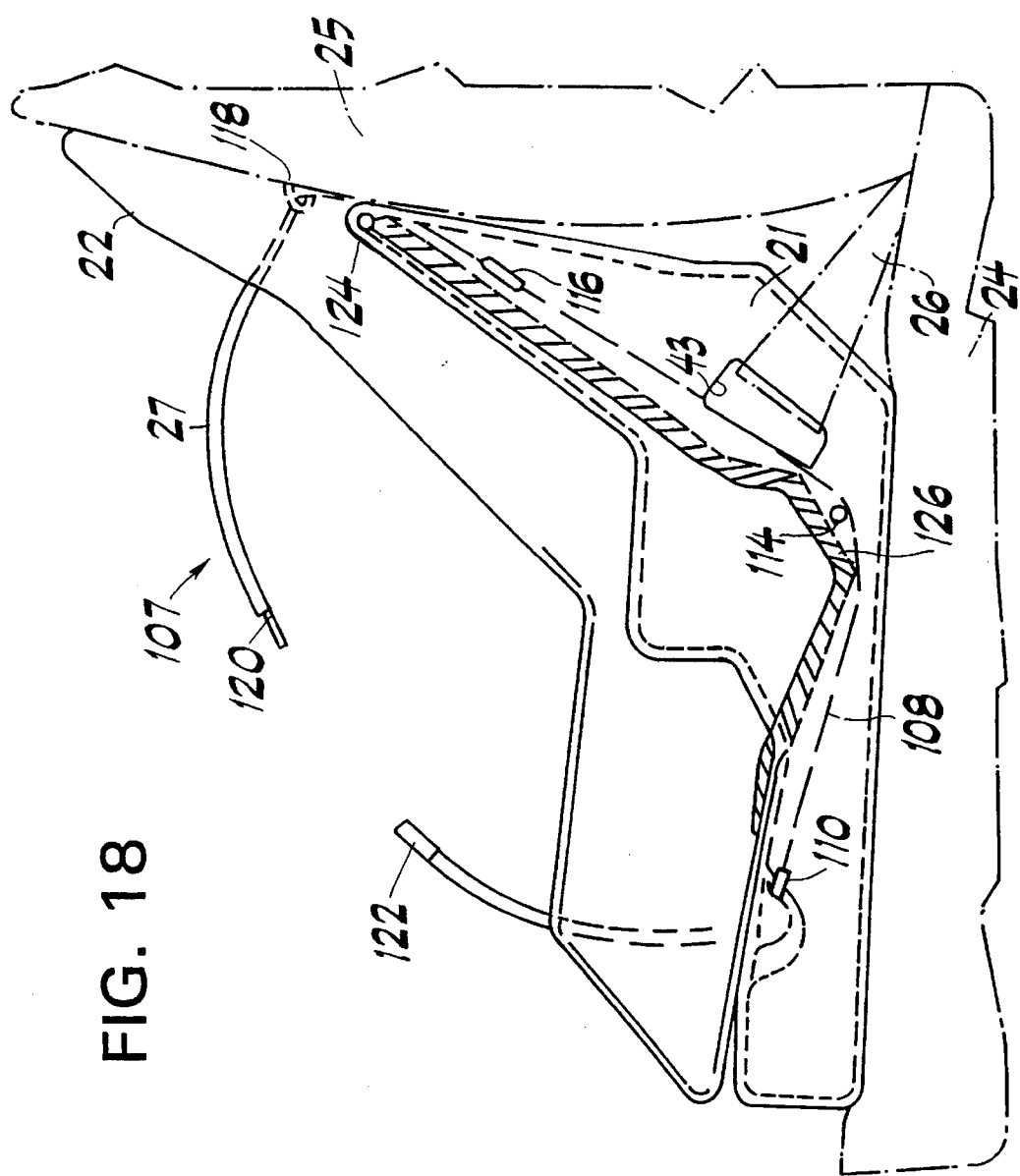
FIG. 18 is a side view of a seventh embodiment of the invention.
Figure 19:
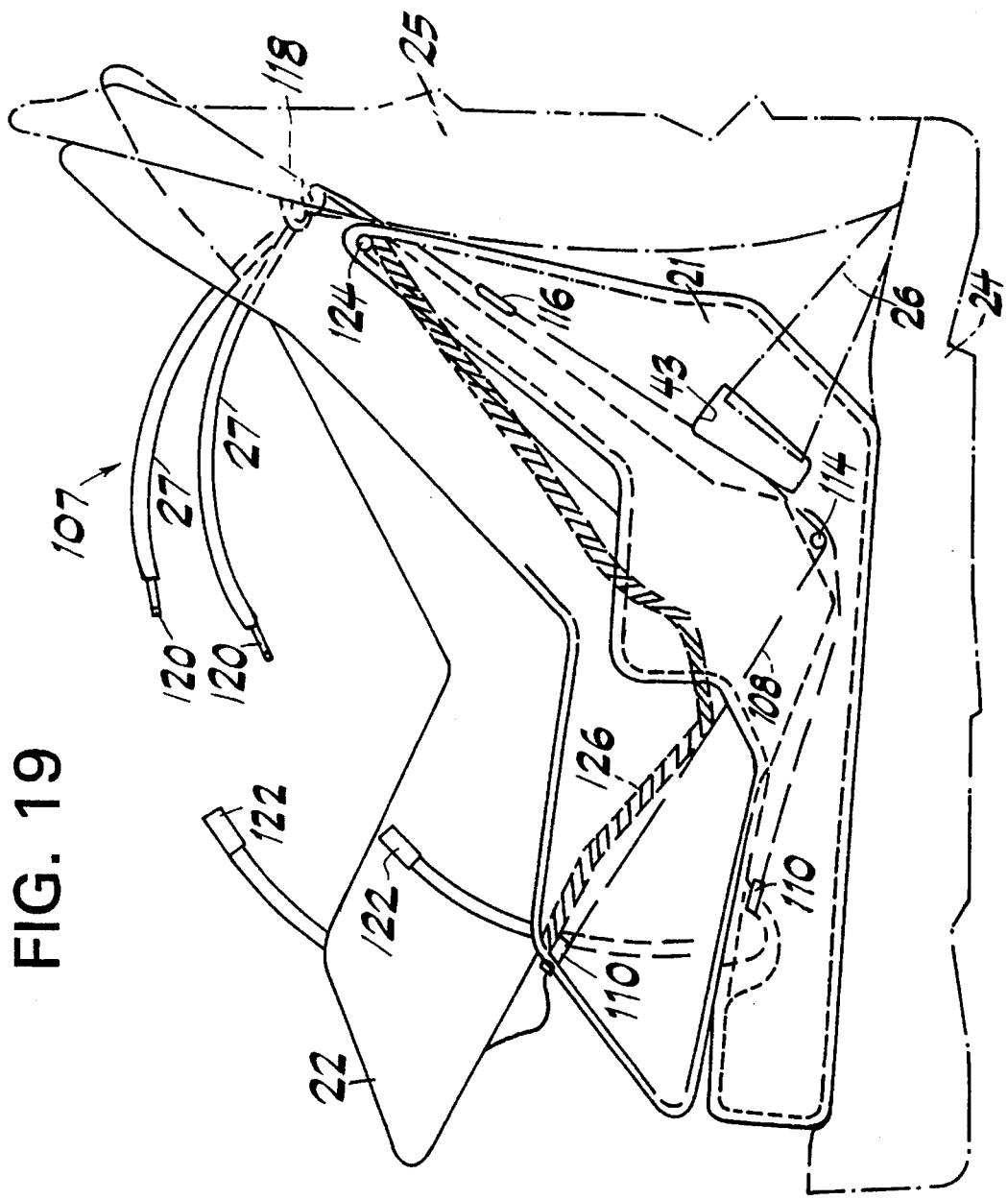
FIG. 19 is a side view similar to FIG. 18 but with the seat in an elevated position responsive to sudden deceleration.

A seventh embodiment of the invention is shown in FIGS. 18 and 19. The seat illustrated in FIG. 18 includes a seat belt restraining device similar to that of the previous embodiment. However, the seat of FIGS. 18 and 19 is designed to pivot around a fixed axis to move upwardly and forwardly, in response to the sudden deceleration of the vehicle. The seat section of the seat of FIGS. 18 and 19 includes a rigid frame member indicated by numeral 126. Member 126 is coupled to frame 21 such that it may rotate about bolt 124 in response to sudden deceleration of the vehicle. The operation of the seat belt tightening mechanism is accomplished in a manner similar to that of the previous embodiment. It may be observed that rod 114 has been relocated to maximize the belt tightening effect. However, it is apparent that a wide range in the amount of belt tightening may be achieved by mounting rod 114 at any number of locations.

In a seat according to an eighth embodiment of the present invention, rod 114 is designed such that it will plastically deform to a certain extent as the seat belt is tightened around it in response to the sudden deceleration of the vehicle. This reduces the secondary, or recoil impact on the child as a portion of the kinetic energy is dissipated in plastically deforming rod 114. Those skilled in the art will recognize that the desired amount of plastic deformation of rod 114 may be achieved while maintaining a desired amount of belt tightening for a collision at a given speed by considering the range of weight of the children the seat is designed to hold and altering the position and strength of rod 114 accordingly.

Figure 20:
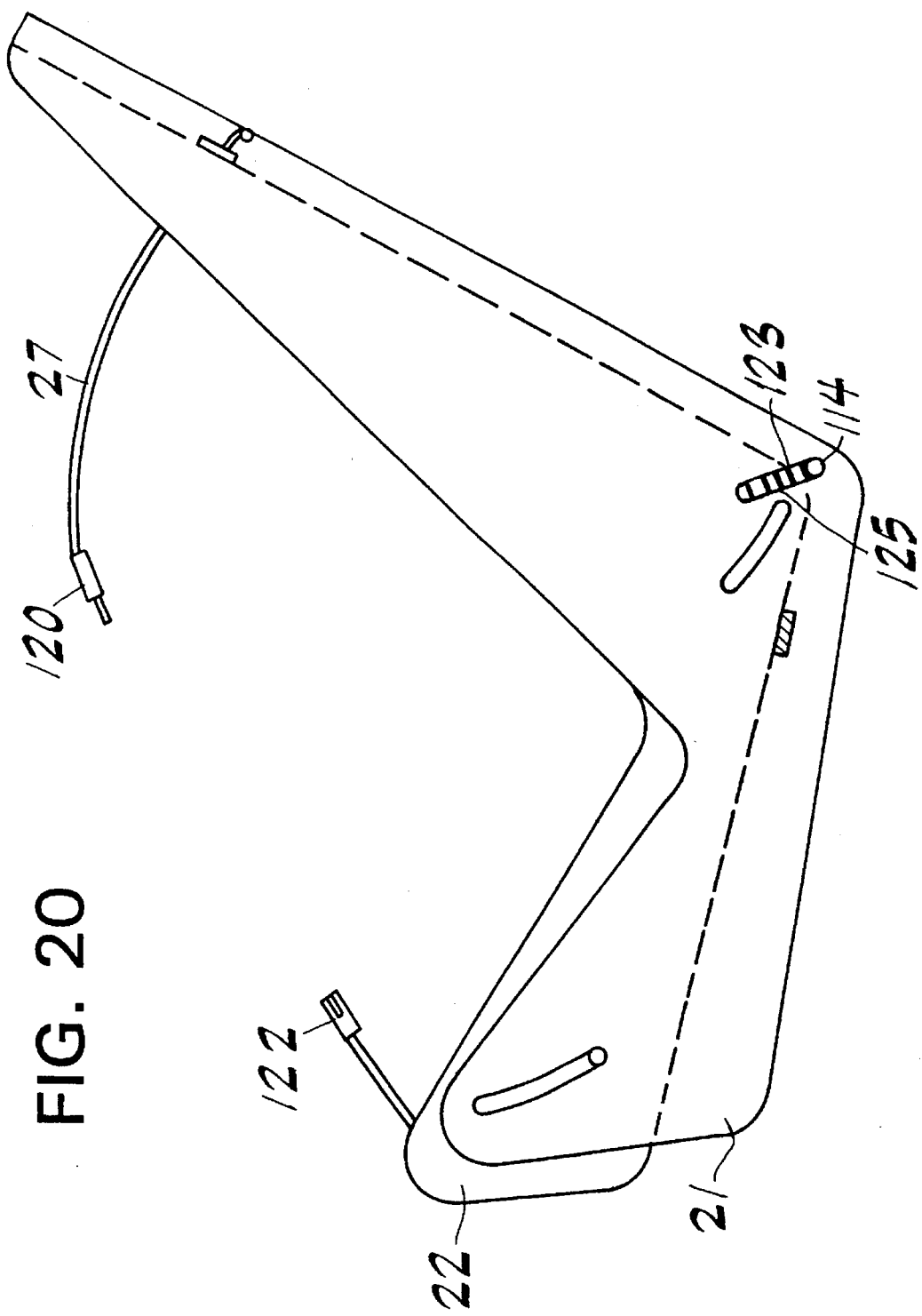
FIG. 20 is a side view of an ninth embodiment of the present invention.

Referring now to FIG. 20, there is shown a seat according to a ninth embodiment of the present invention. It may be seen that rod 114 of this seat is mounted within slot 123. Break-away slats 125 are mounted within slot 123, and impede the motion of rod 114 through slot 123. Slats 125 may be designed to provide a minimum forward force before rod 114 will move in slot 123. It will be understood by those skilled in the art that the minimum amount of forward force which will generate movement of rod 114 in slot 123, as well as the amount of resistance to the subsequent movement of rod 114 in slot 123, may be set to any desired values by varying the strength of slats 125. In addition, there are numerous other devices, such as shock absorbers and springs, which may be substituted for slats 125 to provide the desired resistance to the movement of rod 114 within slot 123.

Slot 123 is shown as proceeding upward and forward from the rest position of rod 114. It may be seen that, as rod 114 is pulled upward into slot 123 by the upward and forward motion of the seat, the belt tightening effect of rod 114 will be less than that achieved by seats in which rod 114 is stationary. This allows the designer to achieve and maintain a maximum belt tightening amount. As described above, the resistance of slats 125 will hold rod 114 stationary in all situations in which a minimum forward force is not achieved. Those skilled in the art will recognize that by proper manipulation of the angle of slot 123, the initial resistance to movement and the subsequent resistance to the movement of rod 114 in slot 123 imposed by slats 125, a maximum amount of belt tightening may be set. In addition, this maximum may be maintained as rod 114 travels the length of slot 123. Once again, those skilled in the art will recognize that rod 114 need not move in slots. There are numerous methods for applying this concept, such as a series of rotating arms and proper resistance imposing devices, which will be apparent to those skilled in the art.

Figure 21:
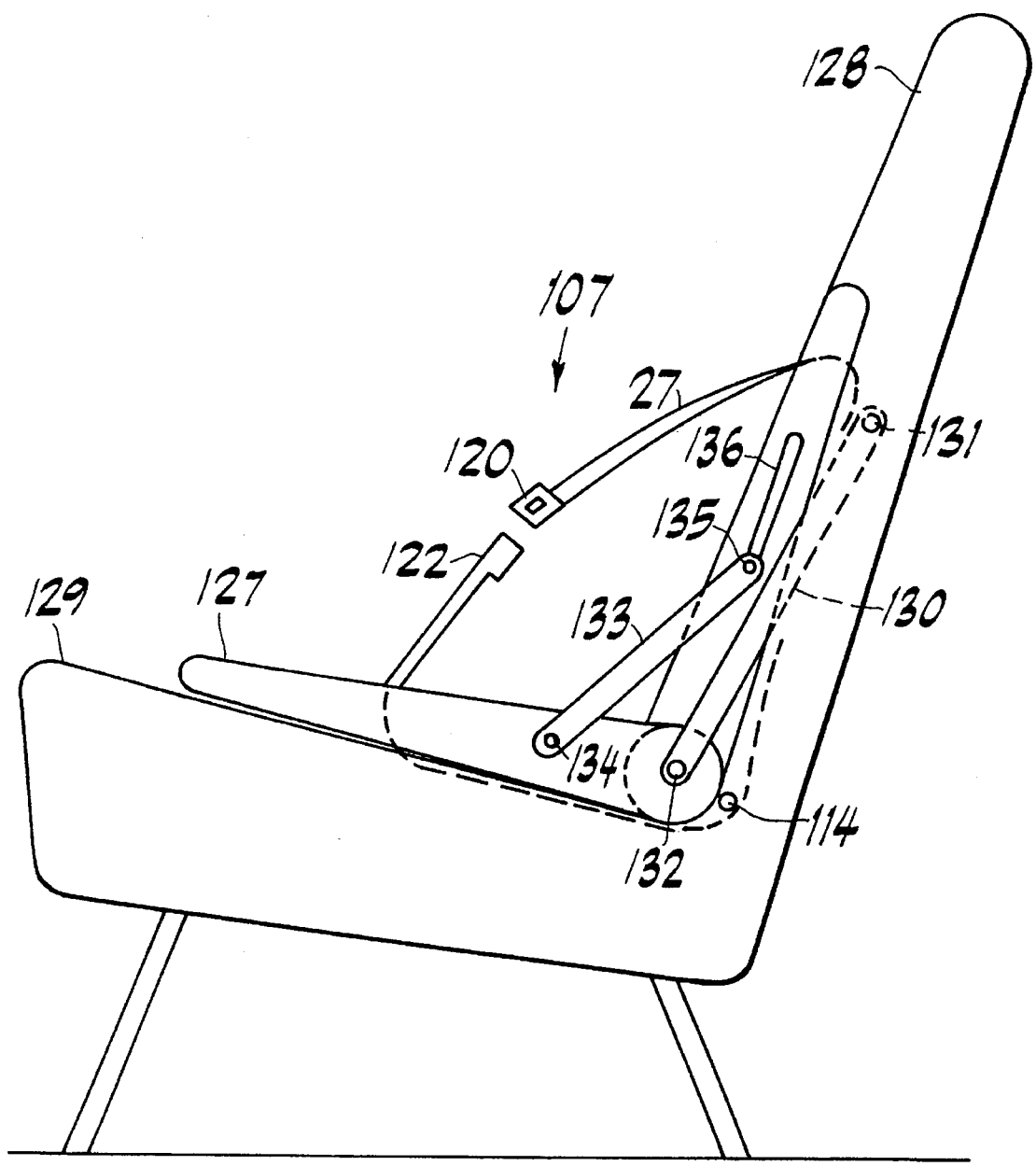
FIG. 21 is a side view of a tenth embodiment of the present invention.
Figure 22:
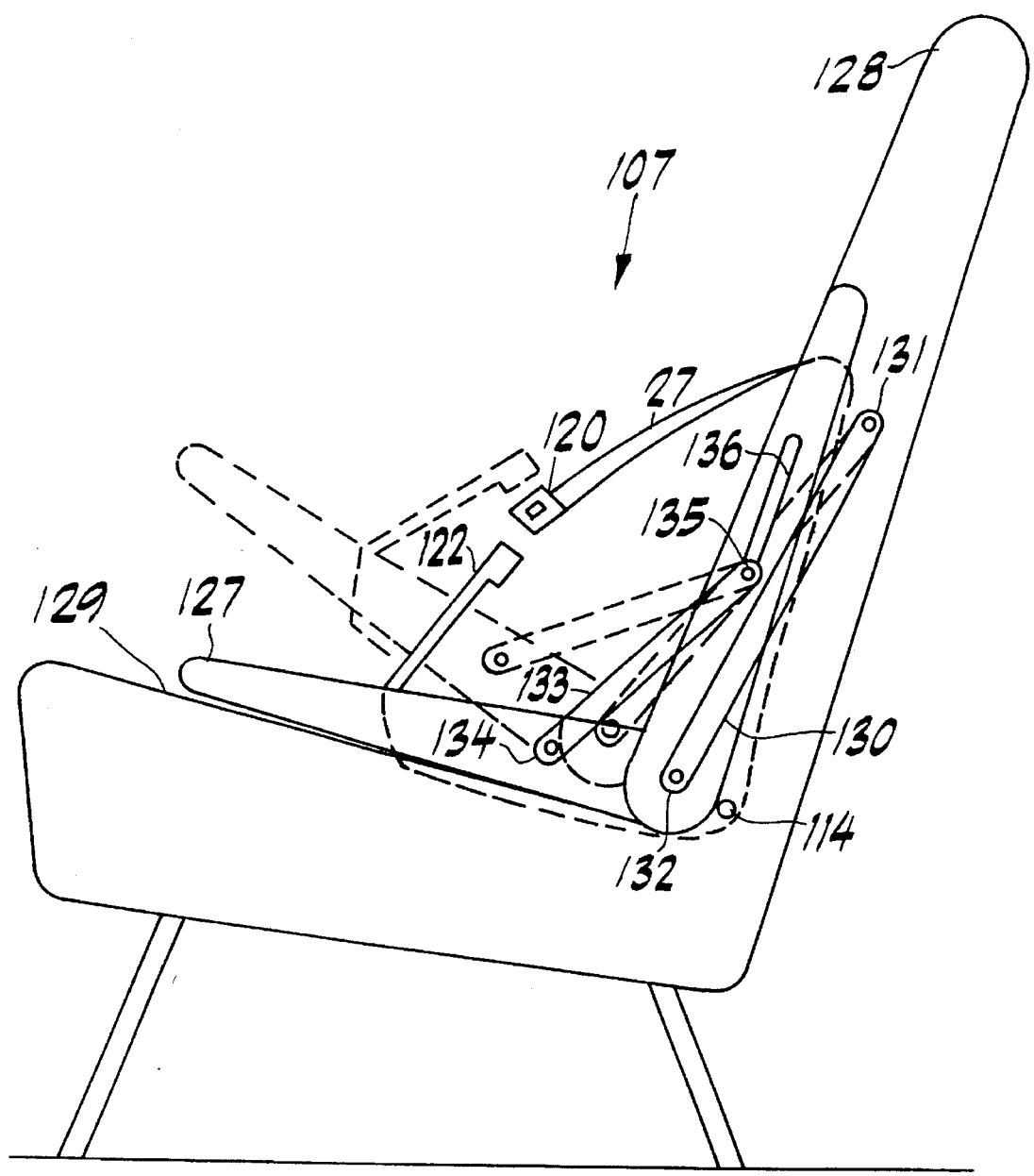
FIG. 22 is a side view similar to FIG. 21 but with the seat in an elevated position responsive to sudden deceleration

A tenth embodiment of the invention is shown in FIGS. 21 and 22. This embodiment illustrates the effectiveness of the teachings of the present invention for a child seat which is permanently mounted on an adult seat of a vehicle such that it may be folded into an out-of-use position. In this position, the child seat bottom 127 is folded flush with the adult seat back 128 such that the adult seat may be occupied. When folded down into an in-use position, the child seat bottom 127 rests on the adult seat bottom 129. One end of bar 130 is rotatably mounted on adult seat back 128 by pin 131. The other end of bar 130 is mounted to child seat bottom 127 by pin 132. Bar 133 also links child seat bottom 127 with the adult seat back 128. Pin 135 is mounted through one end of bar 133 and is slidably mounted within slot 136 which is formed in adult seat back 128. The other end of bar 133 is rotatably mounted to child seat bottom 127 by pin 134.

In operation, the child seat according to this embodiment of the present invention must first be folded down from the out-of-use position to the in-use position. When in the out-of-use position, the child seat bottom 127 is flush with adult seat back 128. A user first pulls the child seat bottom 127 away from adult seat back 128. As this is done, bar 130 remains stationary and child seat bottom 127 pivots about pin 132. At the same time pin 135 slides downward from the upper portion of slot 136 and bar 133 moves down and pivots about pins 134 and 135. When fully extended, child seat bottom 127 rests on adult seat bottom 129. Thereafter, a child is placed in the child seat and seat belt device 107 is adjusted and fastened about the child's body.

In response to sudden deceleration of the vehicle, the child seat bottom will move upward and forward as indicated by the dashed lines in FIG. 22. It will be seen that, as bar 130 is of greater length than bar 133, the forward end of child seat bottom 127 will move upward at a greater rate than the rearward portion of child seat bottom 127. It will be understood by those skilled in the art that the forward momentum, relative to the adult seat, of the child and child seat bottom 127 will maintain pin 135 in the lower end of slot 136. Therefore, bar 133 will rotate about pin 135 in this position thereby raising and moving the forward portion of child seat bottom 127 in response to the sudden deceleration of the vehicle. At the same time, bar 130 will rotate about pin 131 to raise and move forward the rearward portion of child seat bottom 127. As child seat bottom 127 moves forward and upward strap 108 will be tightened about rod 114. The seat belt tightening apparatus of this embodiment operates as in the previously described embodiments.

As explained above, the rearward portion in a seat according to this embodiment will be raised at a lower rate than the forward portion of child seat bottom 127. Those skilled in the art will appreciate that movement of the various portions of child seat bottom 127 may be varied significantly without departing from the teachings of the present invention.

Those skilled in the art will recognize that by simple modification of the disclosed embodiments the invention may be practiced for all seats which move in response to the sudden deceleration of a vehicle. Any belt of fixed length which extends from an anchor to a point on a seat, and extends from this point across a persons body to a buckle, may be tightened by lengthening the portion between the anchor and the point on the seat. According to the present invention, this portion of the seat belt is lengthened as the seat moves in response to the sudden deceleration of the vehicle.

As seen in FIG. 23, a seat according to an eleventh embodiment of the present invention includes a seat belt device indicated generally by numeral 107. It may be seen that strap member 137, which couples buckle 122 to pin 138, extends around and is supported by rod 114 which has been coupled to the forward portion of the base 21. Pin 138 is mounted within a slot 139 which is formed in the base 21. When the seat is in a rest position, pin 138 is located in the rearward portion of slot 139 and abuts a projection 140 which extends from the seat 22.

Upon the sudden deceleration of the vehicle, the forward momentum of a child held in the seat 22 by seat belt mechanism 107 will be translated into an increased tension in the strap member 137 of seat belt mechanism 107. This tension will act to move pin 138 forward in slot 139. This, in turn, will provide a force against the projection 140 which, in addition to the forward momentum of the seat 22, will tend to cause the seat 22 to rotate and move forward.

Those skilled in the art will recognize that this motion of pin 138 in slot 139 will tend to loosen the seat belt mechanism 107. However, it may be seen that, by manipulation of the orientation of the slot 139, the shape of the projection 140 and through the addition of any of the known means for providing resistance to the motion of pin 138 through the slot 139, enhanced motion of the seat in response to sudden deceleration may be obtained while maintaining a desired maximum belt tightening.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A child safety seat for holding a child, the seat being installed on a seat of a vehicle that is subject to sudden deceleration, the child safety seat comprising:

a base section having means for releasably mounting the base section onto the vehicle seat;

a seat section;

a linkage connected between the seat section and the base section for providing relative movement between the seat section and the base section upon sudden deceleration of the vehicle, wherein the relative movement provided by the linkage connected between the seat section and the base section provides upward and forward motion of the forward and rearward portions of the seat section relative to the base section;

a restraining member selectively coupleable around the child for restraining the child in the child safety seat; and a restraining member tightening device for tightening the restraining member around the child upon motion of the seat section relative to the base section.

2. A child safety seat according to claim 1, wherein said restraining member includes a first portion that extends from a first point on the seat section across at least a portion of the child's body to a second point on the seat section and a second portion, said second portion extending from said first point on the seat section to an anchor, wherein an aggregate length of said first and second portions is fixed upon the coupling of said restraining member around the child, wherein said tightening device shortens said first portion.

3. A child safety seat according to claim 2, wherein said tightening device includes a supporting member which supports the restraining member at a point fixed with respect to said seat section upon motion of said seat section relative to said base section.

4. A child safety seat according to claim 3, wherein the supporting member is mounted to the base section such that it may move along a predetermined path from a rest position, in response to the sudden deceleration of the vehicle to maintain a predetermined amount of seat belt tightening.

5. A child safety seat according to claim 4, further comprising means for maintaining the supporting member in the rest position when the amount of seat belt tightening is below a predetermined threshold level.

6. A child safety seat according to claim 4, further comprising means for providing a predetermined amount of resistance to the motion of the supporting member relative to the base section, for maintaining a predetermined amount of seat belt tightening.

7. A child safety seat according to claim 3, wherein the seat section comprises a top portion for supporting the child and a bottom portion, and wherein the second portion of said restraining member is coupled to said bottom portion of said seat section and extends around said supporting member, the supporting member being coupled to the base section, wherein said second portion extends from the supporting member to said first point, said first point defining an opening in the seat section, and wherein said first portion of the restraining member extends from said first point across the child's body to a device for selectively coupling the restraining member to the seat section.

8. A child safety seat according to claim 3, wherein said supporting member is coupled to the base section.

9. A child safety seat according to claim 3, wherein said supporting member is coupled to the vehicle.

10. A child safety seat according to claim 1, wherein the upward motion of the forward portion of the seat section is greater than the upward motion of the rearward section of the seat section.

11. A child safety seat that can be installed on a seat of a vehicle, the child safety seat comprising:

a base section having means for releasably mounting the base section onto a vehicle seat;

a seat section;

a linkage connected between the seat section and the base section for providing relative movement between the seat section and the base section when the acceleration of the vehicle in any direction exceeds a predetermined threshold value, wherein the relative movement provided by the linkage connected between the seat section and the base section provides upward and forward motion of the forward and rearward portions of the seat section relative to the base section;

at least one restraining member selectively coupleable about an occupant; and a tightening device for tightening at least one restraining member about the occupant upon motion of the seat section relative to the base section.

12. A method for restraining a child in a child safety seat having a base section selectively coupleable to the vehicle and a seat section coupled to the base section such that the seat section moves along a predetermined path relative to the base section upon the acceleration of the vehicle in any direction exceeding a predetermined threshold level, wherein the seat section defines forward and rearward portions, and wherein both the forward and the rearward portions of the seat section move forward and upward upon the sudden deceleration of the vehicle, the method comprising the steps of:

coupling at least one restraining member across the body of the child such that the child is located between the seat section and each restraining member; and tightening the restraining member around the child upon movement of the seat section relative to the base section.

13. The method according to claim 12, wherein at least one restraining member comprises a first portion coupled across the child's body so that the child is located between the first portion and the seat section, and at least one second portion extending from the seat section, further comprising the steps of:

holding the maximum total length of the first section and the second sections constant after coupling the restraining member across the child's body;

shortening the first section upon relative movement between the seat section and the base section to tighten the restraining member around the child.

14. The method according to claim 13, wherein the restraining member is supported at a third point, and wherein, upon relative motion between the seat section and the base section, the seat section moves away from the third point.

15. The method according to claim 14, wherein the third point is defined on a member coupled to the vehicle.

16. The method according to claim 14 wherein the third point is defined on a member coupled to the base section.

17. The method according to claim 16, wherein the member coupled to the base section is plastically deformed upon sudden deceleration of the vehicle.

18. The method according to claim 16, wherein the third point is defined on a member coupled to the seat section.

19. The method according to claim 18, wherein the member coupled to the seat section is plastically deformed upon sudden deceleration of the vehicle.

20. A child safety seat that can be installed on a seat of a vehicle, the child safety seat comprising:

a base section having means for releasably mounting the base section onto a vehicle seat;

a seat section;

a linkage connected between the seat section and the base section for providing relative movement between the seat section and the base section when the acceleration of the vehicle exceeds a predetermined threshold value, wherein the relative movement provided by the linkage connected between the seat section and the base section provides upward and forward motion of the forward and rearward portions of the seat section relative to the base section;

at least one restraining member selectively coupleable about an occupant; and a tightening device for tightening at least one restraining member about the occupant, said device including a member which is plastically deformed to dissipate kinetic energy as the restraining member is tightened about the occupant upon motion of the seat section relative to the base section.

21. A child safety seat according to claim 20, wherein said restraining member includes a first portion that extends from a first point on the seat section across at least a portion of the occupant's body to a second point on the seat section and a second portion, said second portion extending from said first point on the seat section to an anchor, wherein an aggregate length of said first and second portions is fixed upon the coupling of said restraining member around the body of the occupant, and wherein said tightening device shortens said first portion upon motion of the seat section relative to the base section.

22. A child safety seat according to claim 21, wherein the seat section comprises a top portion for supporting the child and a bottom portion, and wherein the second portion of said restraining member is coupled to said bottom portion of said seat section and extends around said plastically deformable member, the plastically deformable member being coupled to the base section, wherein said second portion extends from the plastically deformable member to said first point, said first point defining an opening in the seat section, and wherein said first portion of the restraining member extends from said first point across the child's body to a means for selectively coupling the restraining member to the seat section.

* * * * *

UNITED STATES PATENT AND TRADEMARK OFFICE
CERTIFICATE OF CORRECTION

PATENT NO. : 5,462,333

DATED : October 31, 1995

INVENTOR(S): Randall Beauvais

It is certified that error appears in the above-identified patent and that said Letters Patent is hereby corrected as shown below:

In Column 13,, line 46,
        change "claim 16", to --Claim 14--.

Signed and Sealed this

Fourteenth Day of May, 1996

Attest:

BRUCE LEHMAN

Attesting Officer      Commissioner of Patents and Trademarks